Aug. 22, 1933.  E. S. KILLIAN  1,923,733
APPARATUS FOR MANUFACTURING THIN RUBBER ARTICLES
Filed Sept. 17, 1931  3 Sheets-Sheet 1
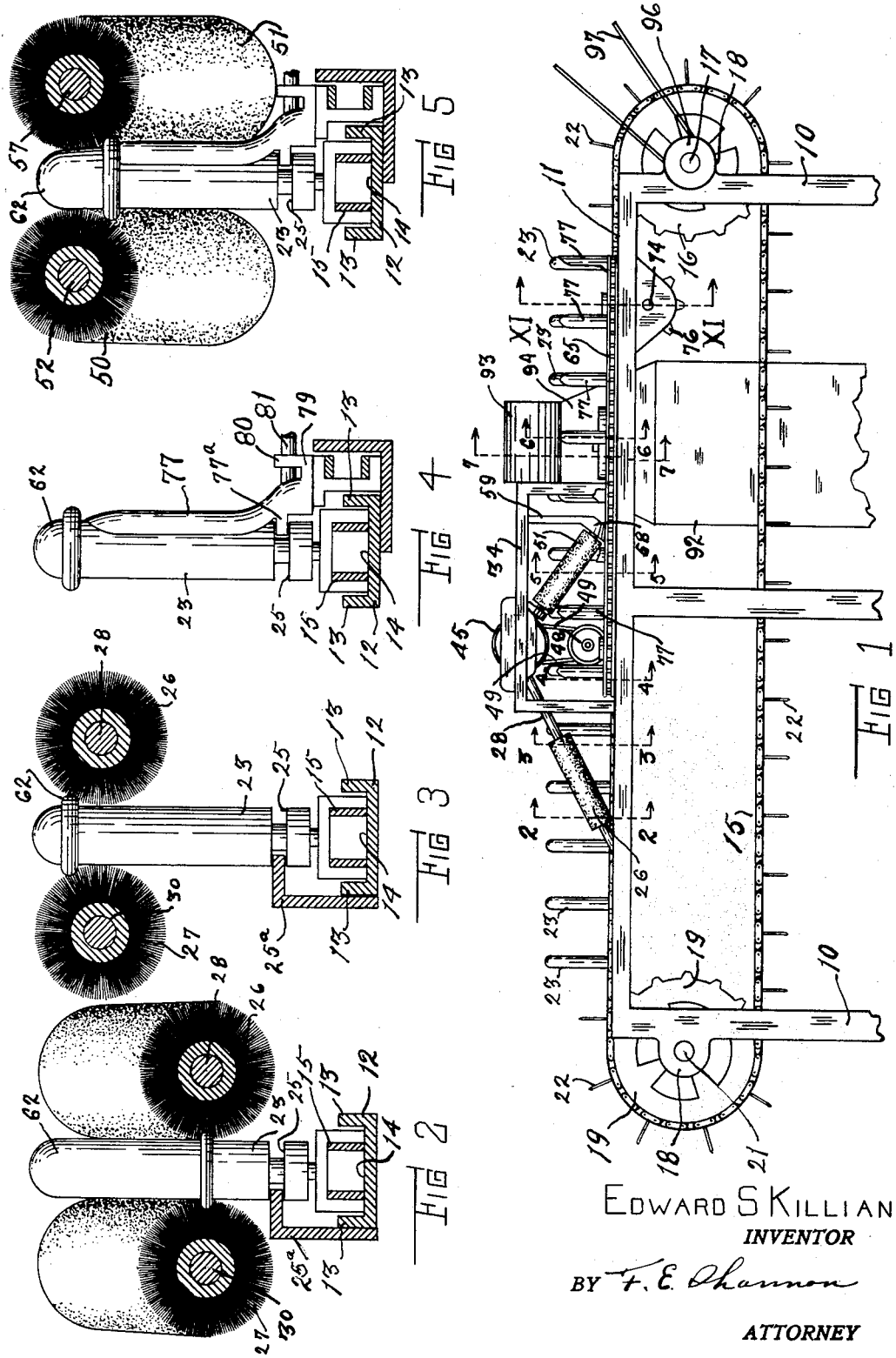
EDWARD S KILLIAN
INVENTOR
BY F. E. Shannon
ATTORNEY

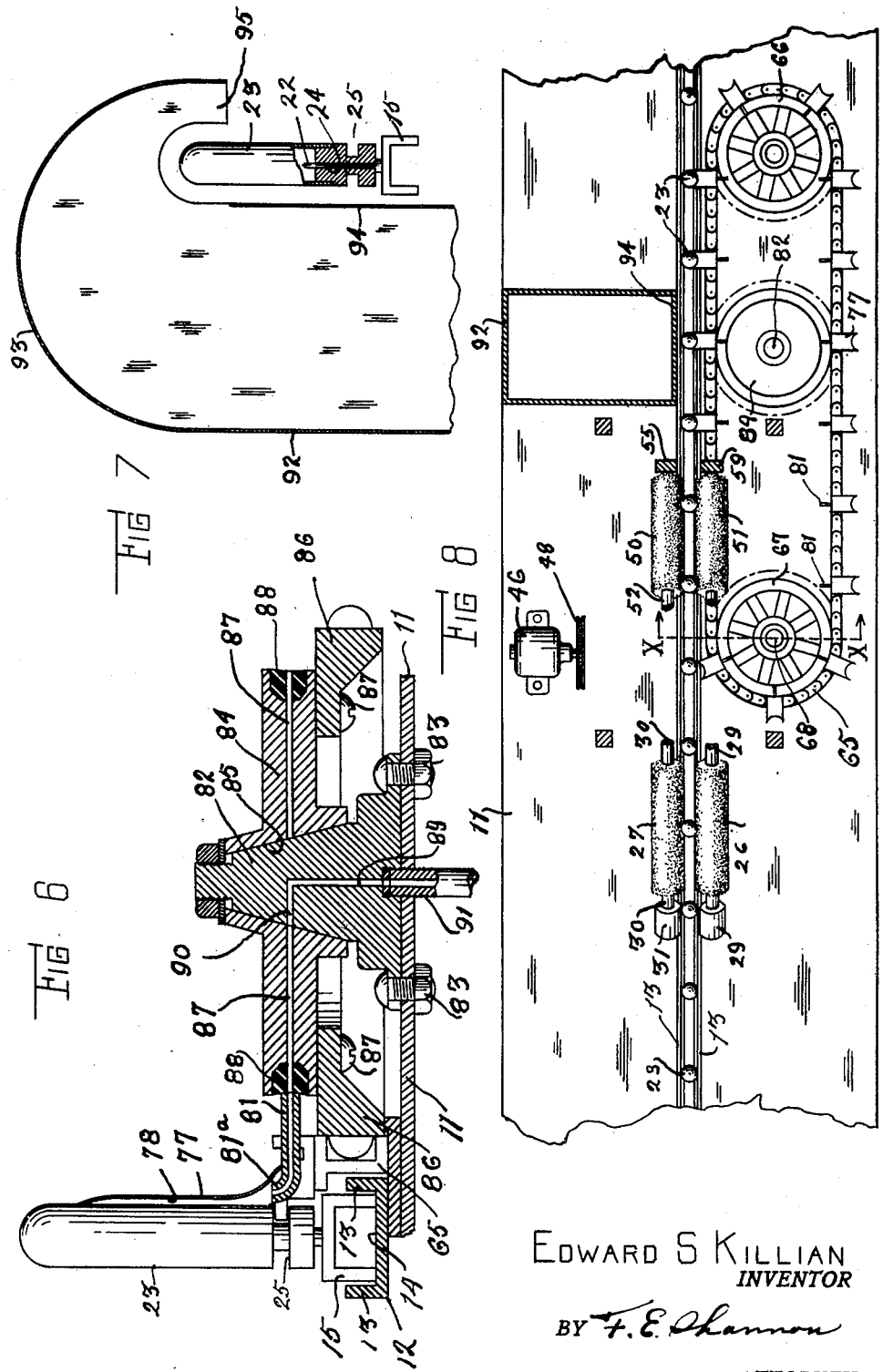

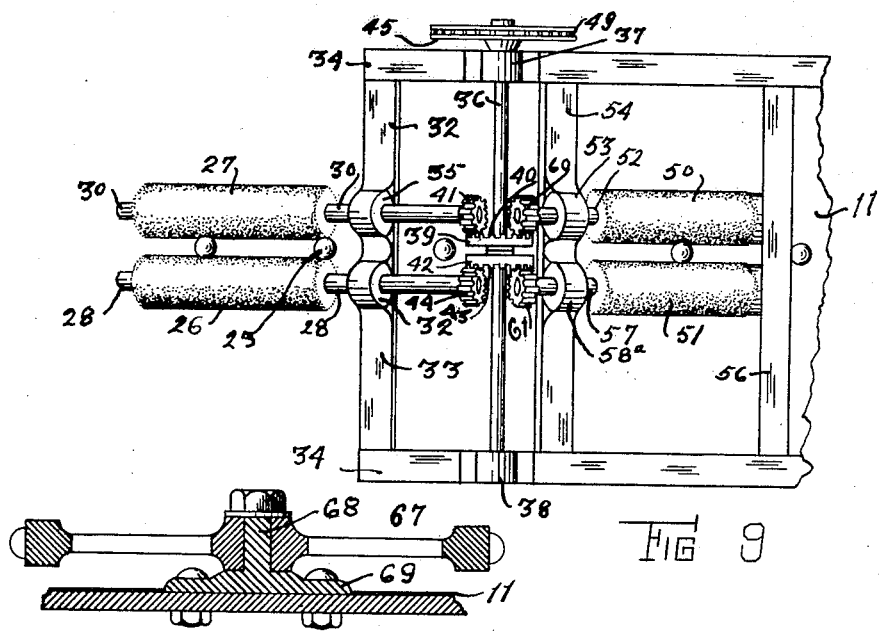
Fig 9
Fig 10
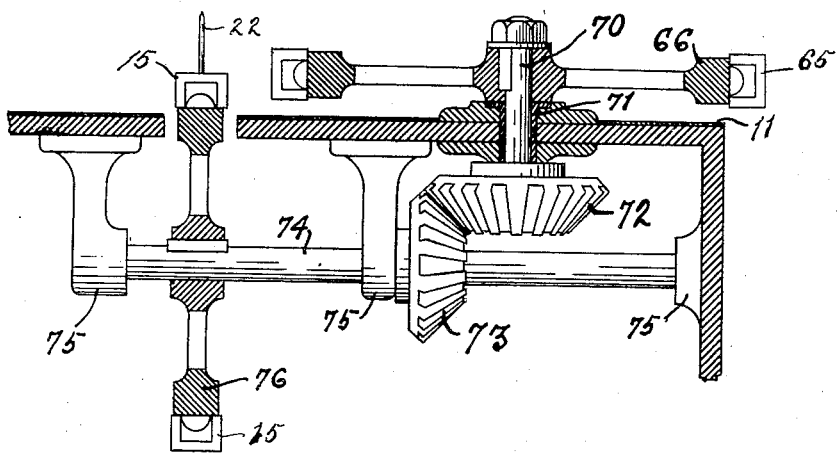
Fig 11
EDWARD S KILLIAN
*INVENTOR*
BY F. E. Dharmon
*ATTORNEY*

Patented Aug. 22, 1933

1,923,733

UNITED STATES PATENT OFFICE 1,923,733

APPARATUS FOR MANUFACTURING THIN RUBBER ARTICLES

Edward S. Killian, Akron, Ohio

Application September 17, 1931
Serial No. 563,248

13 Claims. (Cl. 18—2)

This invention relates to apparatus for dipping rubber articles by coating forms with liquid rubber and has particular reference to an improved method and apparatus for removing the finished articles from the form.

In the manufacture of rubber articles by the dipping process, a form is coated with a rubber solution or dispersion, the coating is dried, the article is subjected to vulcanization and is removed from the form. This is ordinarily done by rolling the article upon itself and off the form. The articles thus removed are in a rolled condition, thus necessitating the manual operation of unrolling for inspection and packing.

Attempts have been made to unroll these articles by tumbling but this method has been found costly and only partly successful. Attempts have been made to remove the article by directing a stream of compressed air, steam or water under pressure between the article and the form, but this method has been unsuccessful as it has been found very difficult to apply a non-adhesive substance to the inner face of the article being removed.

Objects of the invention are to provide apparatus of simple, economical construction, which will be strong and durable and which will automatically remove rubber articles from forms, apply a non-adhesive substance to the inner face thereof and which will deliver the articles in an unrolled condition ready for inspection and shipment.

Other objects are to provide a method of removing such articles which will be very rapid, efficient and reliable and which will eliminate the waste incident to unrolling such articles by hand.

The above objects are accomplished and other ends are attained by the improved method herein set forth and by the combination and arrangement of elements herein described with reference to the accompanying drawings wherein I have shown one form of apparatus for carrying the invention into effect, it being understood that the invention is not confined to the particular form of apparatus shown and that changes and modifications may be made or resort had to substitutions which come within the scope of the appended claims.

In the drawings:

Figure 1 is a side elevational view of a take-off machine constructed in accordance with this invention, Figure 2 is a view partly diagrammatic in character, showing the forms with a rubber article thereon in elevation and showing the conveyor chain, track and brushing elements in vertical cross section, the same being taken as indicated by the lines 2—2 of Figure 1, Figure 3 is a similar view taken as indicated by the lines 3—3 of Figure 1, Figure 4 is a similar view taken as indicated by the lines 4—4 of Figure 1, Figure 5 is a similar view taken as indicated by the lines 5—5 of Figure 1, Figure 6 is a vertical, sectional view of the blowing mechanism employed in carrying out the invention, the same being taken as indicated by the lines 6—6 of Figure 1, Figure 7 is a vertical, sectional view of the upper portion of a take-off chute employed in reducing the invention to practice, the same being shown with the form positioned in operative relation thereto, the form being shown partly in side elevation and partly in vertical cross section, Figure 8 is a plan view of a machine constructed in accordance with this invention, parts being broken away to conserve space and parts shown in horizontal, section to more clearly illustrate the invention, Figure 9 is a plan view of the central portion of the machine taken with parts removed and illustrating the brush element used in carrying out the invention, Figure 10 is a sectional view of one of the sprocket wheels employed in carrying out the invention, the same being taken as indicated by the lines X—X of Figure 8, Figure 11 is a cross sectional view taken as indicated by the lines XI—XI of Figure 1.

In the manufacture of thin rubber articles, forms are coated with liquid rubber latex, rubber cement or other rubber solution or dispersion. The coating is dried, a bead is rolled on the open end thereof and the article is vulcanized. In following this invention to remove the finished article from the forms articles are first coated with talcum powder, starch or any suitable non-adhesive substance. The article is then rolled upon itself toward the end of the form. During this rolling process, a sufficient quantity of the non-adhesive substance on the outer surface of the article is transferred to the inner surface thereof. The rolling operation brings the inner surface in contact with the non-adhesive substance and deposits a sufficient quantity of said substance on the inner face of the article to prevent sticking, regardless of the manner in which the article is rolled or the mechanism employed.

However this invention contemplates the employment of rotating inclined brushes which distribute the non-adhesive substance over the interior of the article and over the form. The article is rolled upwardly to a position as close to the end of the form as is possible and still retain the same thereon. A tongue or insert is then placed against the side of the form and the article is unrolled over the tongue to its initial position. A blast of fluid, preferably air under pressure, is introduced between the article and the form, preferably between the tongue and the form, but as close to the tongue as possible. This blast of air stretches the articles and removes it from the form in an unrolled condition. The air thus introduced into the article forces the tip away from the form and blows the non-adhesive substance deposited on the inner surface of the form as above set forth to the interior surface of the top of the article thereby completely coating the interior surface thereof. As both the form and the inner surface of the article have been thus coated with the non-adhesive substance, it can be easily removed from the form and the use of the tongue while increasing the efficiency of the present invention may be omitted if desired.

The invention will now be described with reference to the particular adaptation thereof disclosed in the drawings. The numeral 10 is used to denote a frame which may be of any suitable construction, but which in the drawing is shown as a long table having a top 11. The numeral 12 denotes a slide which is positioned longitudinally of the top 11. The slide 12 is provided on each lateral side with upwardly projecting flanges 13 forming a channel 14 for receiving the conveyor chain 15. A sprocket wheel 16 is mounted on a shaft 17 which is journaled in suitable bearings 18 at the off-take end of the machine. The sprocket wheel 16 is positioned in alinement with the channel 14 with the upper edge thereof in approximately the same horizontal plane as the bottom wall of the slide 12. A similar sprocket wheel 19 is mounted on a horizontal shaft 21 which extends transversely across the ontake end of the machine and is journaled in suitable bearings 18. The wheels 16 and 19 are disposed in the same vertical plane with the upper edge of the sprocket wheel 19 approximately on a level with the bottom of the slide 12.

The chain 15 is mounted around the sprocket wheels 16 and 19 with the upwardly presented portion thereof extending longitudinally through the channel of the slide 12. The chain 15 is provided at spaced intervals with outwardly projecting pins 22 which are positioned thereon to receive the forms 23. Each form 23 is provided in the lower face thereof with an axle bore 24 adapted to receive the pins 20. Each form 23 is provided adjacent the bottom thereof with a circumferentially extending groove 25.

The numerals 26 and 27 denote rotary brushes one of which is positioned on each side of the slide 12. The brush 26 is fixed on a shaft 28 which extends longitudinally therethrough and projects from each axial end thereof. The shaft 28 is mounted in a bearing 29 which is secured to the top 11 adjacent the ontake end of the machine. The brush 27 is fixed to a shaft 30 which is mounted in a bearing 31, identical with the bearing 29 and is similarly mounted adjacent the ontake end of the machine.

The upper end of the shaft 28 is mounted in a suitable bearing 32 which is secured to the cross bar 33 of the frame 34 which is mounted on the top 11. The shaft 30 is likewise mounted in a bearing 35 which is mounted on the cross bar 32. As will be seen in the drawings the brushes 26 and 27 are inclined upwardly and the upwardly inclined ends of both brushes terminate below the upper end of the forms 23, when the same are positioned on the conveyor chain 15. A horizontal shaft 36 is journaled in the bearings 37 and 38 which are mounted on the frame 34 so as to extend transversely across the frame 34 at a right angle to the slide 12.

The numeral 39 denotes a wheel which is secured to the shaft 36. The wheel 39 is provided on one axial face thereof with marginal teeth 40. The shaft 30 is provided on the upper end thereof with a spur wheel 41 which is in mesh with the teeth 40 on the wheel 39. An oppositely positioned wheel 42 is mounted on the shaft 36 and is provided on one axial face thereof with gear teeth 43. The shaft 28 is provided with a spur wheel 44 which is in mesh with the teeth 43 on the wheel 42. The shaft 36 projects beyond the frame 34 and is provided with a sprocket wheel 45.

The numeral 46 denotes an electric motor which is positioned on the upperside of the top 11 and which is provided with a drive sprocket 48. The sprocket wheels 45 and 48 are operatively connected by means of a sprocket chain 49 whereby the motor 46 may be operated to rotate the brushes 46 and 47.

The numerals 50 and 51 denote like brushes which are similarly mounted relative to the slide 12, but which are inclined downwardly. The brush 50 is mounted on a shaft 52. The upper end of the shaft 52 is mounted in the bearing 53 on the cross arm 54. The other end of the shaft 52 is mounted on an arm 55 which depends from the cross member 56 of the frame 34. The brush 51 is fixed to the shaft 57 and the forward end of the shaft 57 is mounted in a bearing 58a which is suitably secured to the cross arm 54. The downwardly inclined end of the shaft 57 is mounted in a suitable bearing 58 on the lower end of an arm 59, which is similar to the arm 55. The arm 59 depends from the cross member 56. The shaft 52 is provided on the upper end thereof with a spur gear 60 which is in mesh with the teeth 40 on the gear 39. The shaft 57 is likewise provided with a spur gear 61 which is in mesh with the teeth 43 on the wheel 42.

The motor 46 is operated to rotate the brush 26 in a contra-clockwise direction and to operate the brush 27 in a clockwise direction. By this arrangement it will be seen that the sides of the brushes 26 and 27 which contact with the forms 23 are moving upwardly whereby a rubber article 62 positioned on one of the forms 23 will be rolled upwardly upon itself by the brushes 26 and 27 as the forms are moved forwardly by the conveyor 15. As the brushes 26 and 27 terminate below the top of the forms, each article will be rolled to a position adjacent the top of the form on which it is positioned.

As the spur gears 60 and 61 are positioned on the opposite side of the shaft 36, the same operation will move the brush 50 in a clockwise direction and the brush 51 in a contra-clockwise direction. By this arrangement the sides of the brushes contacting with the forms 23 are moved downwardly whereby the article 62 may be rolled downwardly on the forms to its original position.

The numeral 65 denotes a second conveyor chain which is mounted on the sprocket wheels 66 and 67. The wheel 67 is rotatably mounted on a vertical shaft 68 and the shaft 68 is mounted on a suitable base 69 which is suitably fixed to the top 11 at a point adjacent the end of the brush 27. The sprocket wheel 66 which is similar to the sprocket wheel 67 is fixedly secured to the shaft 70. The shaft 70 is journaled in a suitable bearing 71 which is secured to the top 11 at a point adjacent the offtake end of the machine. The conveyor chain 65 is mounted on the sprocket wheels 66 and 67 so that the inwardly positioned portion thereof extends in parallel relation to the conveyor chain 15. The shaft 70 projects downwardly through the top 11 and is provided on the downwardly projecting end thereof with a beveled gear 72 which is in mesh with a beveled gear 73 which is fixedly secured to the horizontal shaft 74. The shaft 74 is disposed transversely of the frame 10 and is journaled in suitable brackets 75 which project downwardly from the top 11. A sprocket wheel 76 is keyed to the shaft 74 at a point directly below the chain 15. The chain 15 is operatively mounted on the upper edge of said sprocket 76 whereby the movement of the chain 15 will drive the sprocket 76 thereby rotating the shaft 74 and driving the sprocket chain 65.

The gears 72 and 73 and the sprocket wheel 66 are proportioned to drive the chain 65 at exactly the same speed as the chain 15. The chain 65 is provided with a plurality of upstanding tongues 77 which are spaced on the conveyor chain 65 the same distance apart as the forms 23 on the chain 15. Each tongue 77 is provided with a concave side which is adapted to fit against one of the forms 23. The tongue 77 tapers to a knife-like edge at the upper end thereof with the central portion of the tongue spaced away from the forms 23. The tongue 77 thus fits snugly against the form at the upper edge thereof, but is inclined away from the base thereof to provide a space 78 between the main body of the tongue and the form. Each tongue 77 is provided with a suitable base 79 which terminates in an upwardly turned portion 80. A tube 81 is mounted in the upwardly turned portion 80 with the inner end thereof terminating in an elbow 81a. The elbow 81a is turned upwardly toward the space 78 so that a blast of air delivered thereby will be directed into said space 78. The tube 81 projects from the upwardly turned portion 80 as shown in the drawings.

The numeral 82 denotes a valve core which is in the form of a stub shaft fixedly secured to the top 11 by means of the bolts 83 or any suitable fastening means. The valve core 82 is provided with a conical surface and a valve wheel 84 having a conical bore 85 is secured to the lower edge of the valve wheel 86 by means of the bolts 87 or other suitable fastening means so as to be engaged by the chain 65 whereby the valve wheel 84 will be turned in unison with the chain 65. The wheel 84 is provided with a plurality of bores 87 which project radially therefrom. The bores 87 are circumferentially spaced to meet the pipe 81 on each tongue 77 as the same is driven past the valve wheel 84. Each bore 87 is enlarged adjacent the other end thereof and a rubber packing member 88 is suitably secured therein whereby a relatively tight joint is formed between the wheel 84 and each tube 81.

The valve core 82 is provided with a bore 89 which extends upwardly therein and terminates in a horizontal bore 90 which is adapted to communicate with the bore 87 when the tube 81 is in communication therewith. The bore 89 is enlarged at the lower end thereof and a tube 91 is operatively secured therein. The tube 91 leads to a compressed air tank or other means to supply air or other fluid under pressure.

The machine is provided on the side directly opposite the valve wheel 84 with a vertical chute 92. The upper wall 93 of the chute 92 is curved laterally and extends over the forms 23 on the chain 15. The wall 94 of the chute 92 adjacent the chain 15 extends upwardly to a point adjacent the upper end of the forms.

It will thus be seen that the upper wall 93 projects beyond the wall 94 thereby leaving an opening 95 to receive rubber articles removed from the form as hereinafter set forth. The sprocket wheel 16 may be driven by any suitable means. In the drawings, I have shown a drive pulley 96 on which is operatively positioned a drive belt or chain 97 which may be operatively connected to a drive shaft or other driving means.

In operation, the forms may be dipped and vulcanized in any suitable manner. A non-adhesive substance is applied to the outer surface thereof. The operator places one of the forms 23 on each pin 22 as the same are moved to the ontake end of the machine. The forms 23 are thus carried forwardly to the brushes 26 and 27 which engage the rubber article 62 as shown in Figure 2 to roll each article upon itself.

As the brushes 26 and 27 terminate adjacent the upper end of the forms 23, the rolling operation is completed in the position shown in Figure 3. As the angle iron 25a is received in the slot 24, the upward movement of the brushes 26 and 27 do not move the forms 23 from the chain 15. A part of the non-adhesive substance on the outer surface of each article is transferred by the brushes 26 and 27 to the forms and to the inner face of the article as the same is rolled upwardly thereon thus thoroughly coating the same. As each form is carried forwardly by the chain 15, the tongue 77 is positioned against each form as shown in Figure 4 with the rolled up article 62 positioned above the upper end of the tongue 77.

The form 23 and the tongue 77 are carried forwardly in contact with each other and are engaged by the brushes 50 and 51. As shown in Figure 5, the article 62 is rolled downwardly over the tongue 77 to its original position. The tube 81 is then engaged by the valve wheel 84 to bring the pipe into register with the seat 88 and a blast of air under pressure from the tube 91 is directed into the tube 81. This blast of air thus directed between the tongue 77 and the form 23 is of sufficient force to distend the article 62 and blow the same from the form.

As each article 62 is thus forced from one of the forms 23, it is propelled upwardly against the laterally curved top 93 of the chute 92 whereupon it falls downwardly in said chute. As the tongue 77 tapers outwardly at the base thereof the article 62 will be stretched tightly around said base and its movement off the form will be retarded whereupon air between the article and the form will force the article from the form without folding the same or turning it inside out.

It will be seen by an examination of the drawings that the tongue 77 is provided with a lug 77a which fits in the groove 24 whereby the forms will be held against upward movement relative thereto.

While I have shown and described apparatus in which the forms are coated and then transferred to the conveyor whereby the same are carried to the operating means herein described, it will be understood that the articles may be otherwise placed on the forms and that the invention is adapted to be used on any type of machine.

The forms may be permanently mounted on a conveyor or may be mounted on boards or other supports and subjected to the operating means herein described. It will also be understood that other means may be employed for removing the article after it has passed the two sets of brushes 26, 27 and that the principle of the invention may be applied to other purposes.

Having thus illustrated my invention and described the same in detail, what I claim as new and desire to secure by Letters Patent is:—

1. In apparatus for removing thin rubber articles from forms, means to roll the article upon itself to a position adjacent the end of the form, said rolling means adapted to transfer a non-adhesive substance from the outer face of the article to the inner face thereof as it is so rolled, means to unroll the article to its original position and means to introduce fluid under pressure between the form and the article whereby the same will be forced from the form.

2. In apparatus for removing thin rubber articles from forms, means to roll the article upon itself to a position adjacent the end of the form, means to unroll the article to its original position on the form and means to introduce fluid under pressure between the form and the article whereby the same will be forced from the form.

3. In apparatus for removing thin rubber articles from forms, means to roll the article upon itself to a position adjacent the end of the form, an insert, means to position said insert longitudinally against the form; means to roll the article over said insert and means to direct a blast of fluid between the insert and the form.

4. In apparatus for removing thin rubber articles from forms, means to roll the article upon itself to a position adjacent the end of the form, an insert, means to position the insert against the form, means to unroll the article over said insert to its original position and means to introduce fluid under pressure between the form and the article whereby the same will be forced in an unrolled condition from the form.

5. In apparatus for removing thin rubber articles from forms, means to roll the article upon itself to a position adjacent the end of the form, said means adapted to simultaneously transfer a non-adhesive substance from the outer face of the article to the inner face thereof and to the form as the article is so rolled, an insert adapted to fit against one side of the form, means to position one side of the insert against the form, means to roll the article over said insert and means to direct fluid under pressure between the insert and the form.

6. In apparatus for removing thin rubber articles from forms, a conveyor, means for holding the forms on said conveyor, means to operate said conveyor, means to roll the article upon itself to a position adjacent the end of the form as the same is moved forwardly on said conveyor, a second conveyor, inserts mounted on said second conveyor, means to operate said second conveyor to move said insert against the forms as the same are moved forwardly on the first named conveyor, means to unroll the articles on said insert as the same are conveyed forwardly and means to introduce fluid under pressure between the insert and the form to remove the article therefrom.

7. In apparatus for removing thin rubber articles from forms, a conveyor, means for holding the forms on said conveyor, means to operate said conveyor, inclined brushing elements positioned in operative relation to said conveyor, said brushing element adapted to roll the article upon itself to a position adjacent the end of the form as the same is moved forwardly on said conveyor, a plurality of tongues, means to position one of said tongues against each form as the same is moved forwardly on said conveyor; oppositely inclined brushing elements positioned in operative relation to said conveyor, the last named brushing element adapted to unroll the articles over said tongues as the same are conveyed forwardly and means to introduce fluid under pressure between the tongues and the form to blow the article from the form.

8. In apparatus for removing thin rubber articles from forms, a conveyor; means for holding forms on said conveyor; means to operate the conveyor, an upwardly inclined brushing element positioned in operative relation to forms carried forward by said conveyor, said brushing element adapted to roll an article on each form upwardly upon itself to a position adjacent the end thereof, a second conveyor, tongues mounted thereon, each of said tongues having a concave side adapted to fit against said forms, means to drive said second conveyor to bring said tongues in contact with said forms as the same are moved forwardly, a downwardly inclined brushing element adapted to roll each article downwardly over said tongue to its original position and means to introduce fluid under pressure between the tongue and the form.

9. In apparatus for removing thin rubber articles from forms, in combination, conveying means, means to detachably secure forms to said conveying means, means to roll articles positioned on said forms to a position adjacent the end thereof, means to unroll the article to its initial position and means to force the article from the forms.

10. In apparatus for removing thin rubber articles from forms, a conveyor, a plurality of forms, means to mount the forms on said conveyor, inclined elongated brushes positioned on each side of said conveyor in operative relation to said forms, said brushes terminating in spaced relation to the top of the forms, means to rotate said brushes to roll articles positioned on the forms to a position adjacent the ends of the forms, a second conveyor positioned in close parallel relation to the first named conveyor, means to drive both of said conveyors at the same speed; tongues mounted on said second conveyor in parallel relation to said forms, said second conveyor adapted to position one of said tongues against each form as the same are carried forwardly by said conveyor, oppositely inclined, elongated brushes positioned on each side of the first named conveyor, means to rotate said brushes to unroll the articles on said forms, over said tongues and means to direct a blast of fluid under pressure between the tongues and the forms, said means operating at a certain point on said conveyor.

11. That method of removing thin rubber articles from the forms on which the same are constructed, which comprises, applying a non-adhesive substance to the outer face of the article; rolling the article upon itself to a position adjacent the end of the form, transferring a part of the non-adhesive substance on the outer surface of the article to the inner surface thereof as the same is thus rolled, unrolling the article to its original position on the form and applying fluid under pressure between the article and the form to force the article therefrom.

12. That method of removing thin rubber articles from forms which comprises, applying a non-adhesive substance to the outer face of the article; rolling the article upon itself to a position adjacent the end of the form, transferring a part of the non-adhesive substance on the outer surface of the article to the form as the article is thus rolled; unrolling the article to its original position on the form and applying fluid under pressure between the article and the form to force the article therefrom.

13. That method of removing thin rubber articles from forms which consists in rolling the article upon itself to a position adjacent the end of the form, unrolling the article to its initial position on the form, stretching one side of the article away from the form and applying fluid under pressure between the stretched part of the article and the form.

EDWARD S. KILLIAN.